United States Patent [19]

Cullom

[11] Patent Number: 4,813,618
[45] Date of Patent: Mar. 21, 1989

[54] APPARATUS AND METHOD FOR SORTING DEMOLITION DEBRIS

[76] Inventor: James P. Cullom, 6155 - 147 St., Holland, Mich. 49423

[21] Appl. No.: 103,916

[22] Filed: Oct. 2, 1987

[51] Int. Cl.[4] ............................................. B02C 23/18
[52] U.S. Cl. .................................... 241/79.1; 209/173; 209/930; 241/DIG. 38
[58] Field of Search ................. 209/12, 17, 38, 39, 209/172, 173, 172.5, 930; 241/20, 24, 79.1, DIG. 38

[56] References Cited

U.S. PATENT DOCUMENTS

| | | | |
|---|---|---|---|
| 2,771,993 | 11/1956 | Wendt | 209/172 |
| 3,393,876 | 7/1968 | Elmore | 241/20 |
| 3,650,396 | 3/1972 | Gillespie et al. | |
| 3,802,631 | 4/1974 | Boyd | 241/20 |
| 3,817,458 | 6/1974 | Gilberto | |
| 3,817,459 | 6/1974 | Keller et al. | 241/20 |
| 3,945,575 | 3/1976 | Marsh | |
| 4,079,837 | 3/1978 | Grube et al. | |
| 4,270,447 | 6/1981 | Gregorovic | 209/39 X |
| 4,553,977 | 11/1985 | Fry | |

FOREIGN PATENT DOCUMENTS 2545689  4/1977  Fed. Rep. of Germany ........ 209/39

Primary Examiner—Mark Rosenbaum
Attorney, Agent, or Firm—Price, Heneveld, Cooper, DeWitt & Litton

[57] ABSTRACT

A system and method for sorting demolition debris into preselected groups, wherein the system comprises an initial screen for sorting out fine particulate material, a floatation tank for sorting the debris into floatable material and heavy material, a heavy material conveyor for removing the heavy material from the floatation tank, a magnetic conveyor for removing the ferrous metals from the heavy material conveyor, and a hand-sorting conveyor whereby various construction items are removed from the debris so that all that remains is pure concrete and brick debris.

5 Claims, 3 Drawing Sheets

U.S. Patent    Mar. 21, 1989    Sheet 3 of 3    4,813,618
FIG. 6
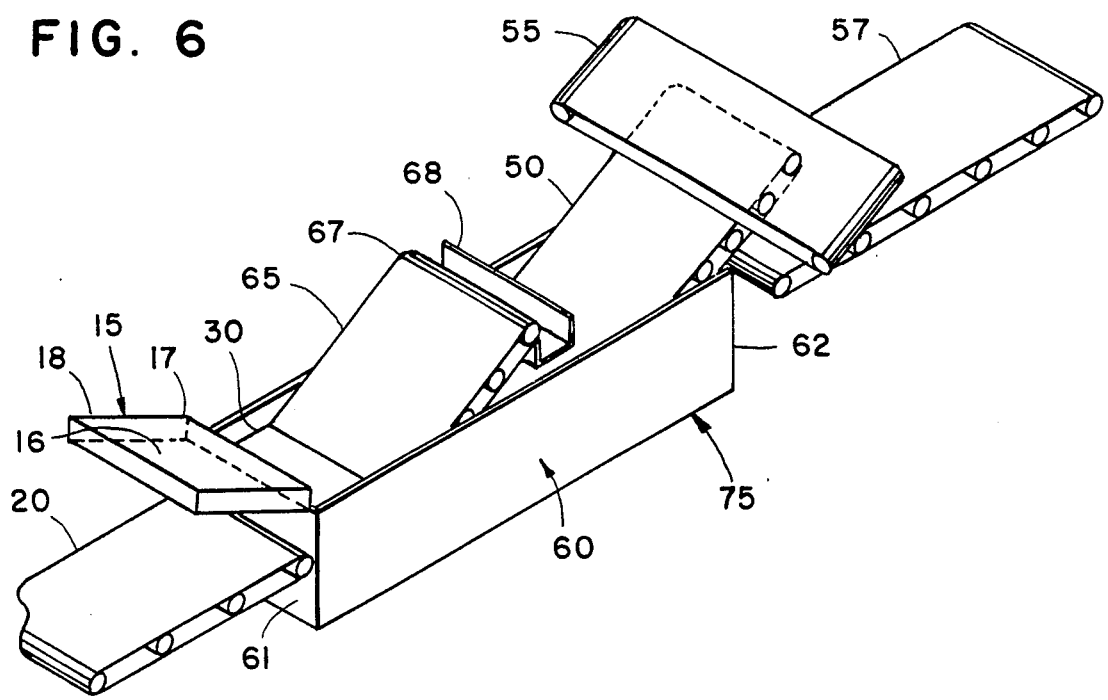
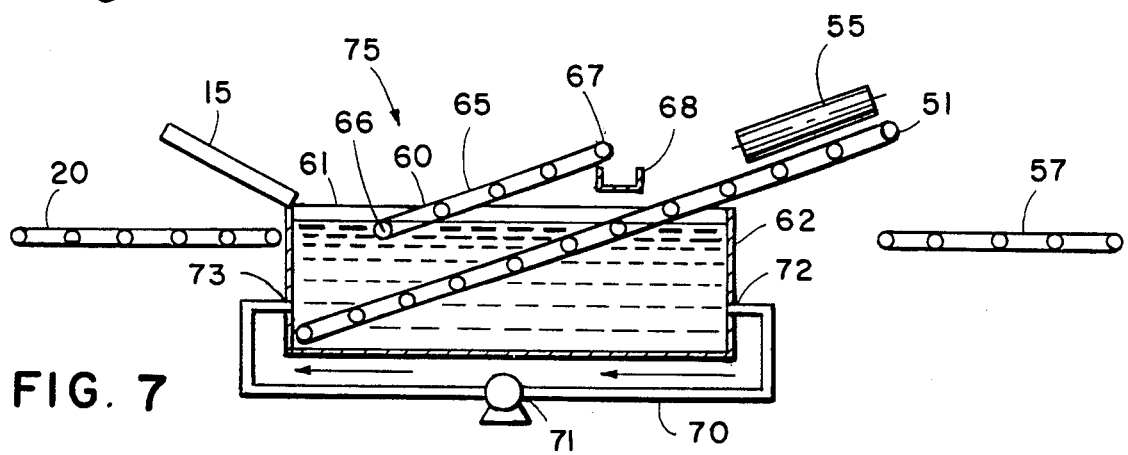
FIG. 7
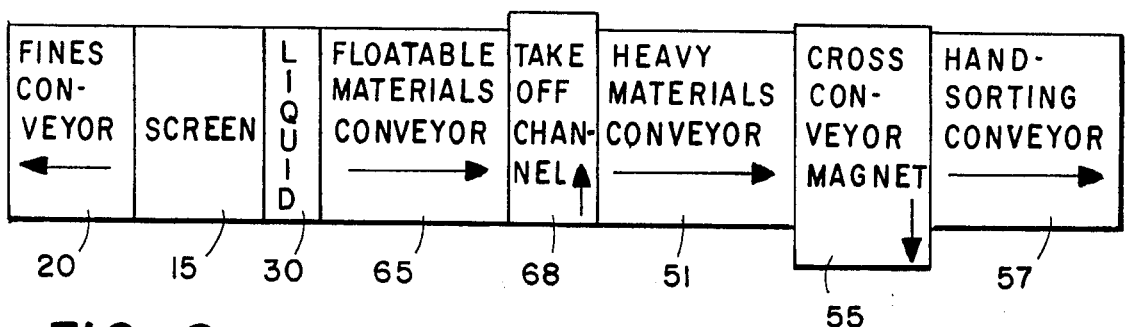
FIG. 8

APPARATUS AND METHOD FOR SORTING DEMOLITION DEBRIS

BACKGROUND OF THE INVENTION

The present invention pertains to a system and method for sorting demolition debris for reclamation and disposal purposes.

In the demolition of buildings and homes an enormous amount of debris is generated. Moreover, the debris is of a unique nature as compared to conventional waste problems, in that it consists primarily of wood, concrete, and other construction materials. The difficulty of handling and disposing of the debris has been a persistent problem.

The debris may be treated entirely as a waste product and hauled to a landfill for proper disposal. This disposal method, however, has several disadvantages. Due to the large volume of debris that may be accumulated, shipping and disposal costs alone could be prohibitive. The situation is made even more acute by the fact that most landfills are being moved to locations further from the city, which compounds the hauling expenses. Furthermore, demolition debris contains a large amount of material that may be reclaimed for various alternative, secondary uses. Hence, not only is mass disposal an expensive venture, it also deprives the community of recyclable materials and the demolition operator of profits that may be had by resale of the reclaimed materials.

In an effort to resolve the problem, the debris has heretofore been collectively dumped at a location where it could be manually hand sorted. While this alternative enables the demolition operator to reclaim reusable materials, and thereby substantially reduce the amount of materials needing to be disposed, the method itself is a very onerous, labor-intensive and time-consuming operation. Hence, while some limited benefits are hereby gained, a great need still exists for a better solution.

Many systems have been developed to handle and dispose of ordinary waste, such as municipal solid waste. These systems are involved with separating various components of the waste for reclamation and/or disposal purposes. However, the nature of the waste and the concerns of the users involved is so drastically different than those in the demolition field, that these systems are of no use to a demolition operator.

SUMMARY OF THE INVENTION

In the present invention, demolition debris sorting is effected by a system especially designed for the materials encountered in such debris. The system involves a sequential operation which separates the debris into at least five predetermined groups. The sorting is selected to maximize the reclamation of material from demolition debris.

The system includes an initial screen means for separating from the debris fine particulate material. Secondly, the floatable material is separated from the heavy material via a floatation tank. A magnetic conveyor means is then utilized to remove the ferrous metals from the heavy metal debris. Lastly, nonferrous material (such as electrical wire and glass) is manually removed from the debris, thereby leaving only substantially pure concrete and brick debris remaining. Also, in a more preferred embodiment, comminuting means may be employed to mill selected groups of the sorted debris, in order to meet certain specifications that are needed for the secondary uses.

The demolition operator, by employing this system, may drastically reduce or even eliminate the amount of debris that is shipped to the landfill. The operator, therefore, not only significantly reduces disposal costs, but also facilitates the recycling of resources, and provides an additional source of income from selling the separated materials to secondary users. Further, the sorting is primarily accomplished by an automatic arrangement which considerably reduces the needed manpower and time previously required. Hence, by utilizing the present invention, the demolition operator may effectively reduce expenses, save resources, and increase profits.

BRIEF DESCRIPTION OF THE DRAWINGS

FIG. 6 is a perspective view of a second embodiment of the invention;

FIG. 7 is a partially schematic side view of the second embodiment of the invention; and FIG. 8 is a schematic view of the second embodiment of the invention.

DETAILED DESCRIPTION OF THE PREFERRED EMBODIMENTS

Figure 1:
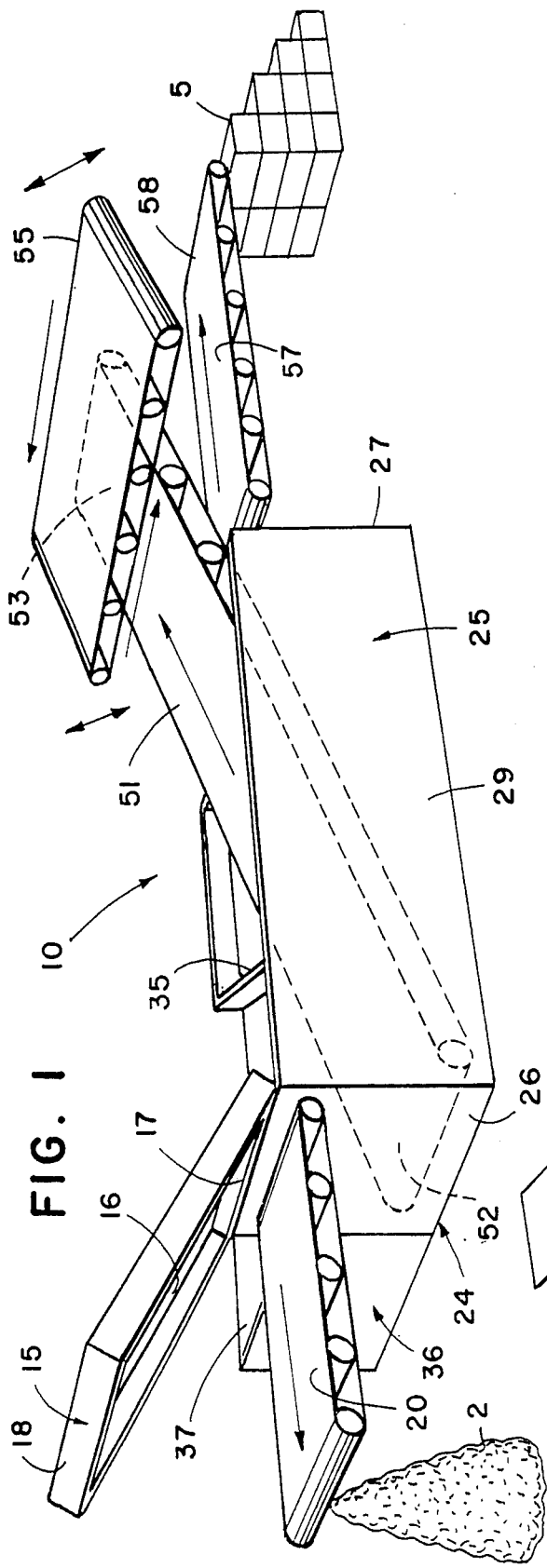
FIG. 1 is a perspective view of a first embodiment of the present invention.

In the preferred embodiment, demolition debris is effectively sorted by a sequential operation which generally comprises an initial screen means 10, a floatation tank 15, a magnetic conveyor means 40, and a final hand sorting conveyor 50 for removing from the debris selected groups which maximize the reclamation of reusable construction materials.

Demolition debris is a collection of unique materials which includes large amounts of wood, concrete, ferrous metal, electrical wire, glass, and a variety of other miscellaneous items. The present invention is specially designed for separating this particular collection of materials in an easy and efficient manner.

First Embodiment

The first phase of separation system 10 comprises a screen means 15 for separating from the debris fine particulate material 2. Fine particulate material 2 primarily includes sand and plaster dust, and its removal from the debris furthers a dual purpose. One is to preclude the floatation tank operation from being fouled. If an excessive amount of fine material 2 is entrained with the floatable debris separated therein, it will defeat the secondary use of burning the floatable material in an incinerator. Secondly, fine material 2 is suitable for use as a filler material at the demolition site or other locations.

Screen means 15 generally comprises a vibratory screen of conventional design. Mesh 16 of screen 15 may be constructed to pass material up to a certain predetermined dimension. In a more preferred embodiment the mesh is generally two inches or less, but may be varied to meet specific needs. Screen means 15 is provided with a first and second end 17, 18, wherein second end 18 is mounted to a first end 26 of floating tank 25. Screen means 15 is mounted at an inclination of generally between 10-40 degrees, so that debris 1 not passing therethrough is moved toward second end 18 and into floatation tank 25. Fine material 2 which passes through screen means 15 lands upon a fine material conveyor 20, whereby it is transferred to a suitable location for accumulation. An appropriate collection means, such as an open container, may be utilized to accumulate fine material 2.

The second phase of sorting system 10 includes a floatation tank 25, which is positioned adjacent and below second end 18 of screen means 15 in order to receive debris 1 therefrom. Floatation tank 25 effectively separates floatable material, which primarily consists of wood, from the heavy material of the debris. The separated wood material may then be sold to a secondary user. Typically it is employed as a fuel source in a commercial incinerator.

In a first embodiment 24 of the present invention, floatation tank 25 is of a generally quadrangular shape with a first and second end 26, 27, and filled with a separation liquid 30, such as water. Extending transversely across floatation tank 25, at the liquid surface level, is a diverter 35 which is designed to direct the floatable material toward a first side 28 of floatation tank 25. Diverter 35 preferably consists of a plate member which is mounted to first and second sides 28, 29 of tank 25 at an angle other than 90 degrees. More specifically, diverter 35 mounts to second side 29 at a point which is closer to first end 26 than where the diverter mounts to first side 28.

Diverter 35 directs the floatable material toward first side 28 where an elongated notch 31 is provided in the upper edge thereof. Notch 31 permits liquid 30, with its floatable material, to cascade over first side 28 and out of tank 25 in a waterfall. Located beneath notch 31, in order to collect liquid 30, is an auxiliary tank 36. Auxiliary tank 36 is contiguous and extends along first side 28 of floatation tank 25 a distance slightly longer than the length of notch 31, so that substantially no liquid 30 is lost.

Figure 5:
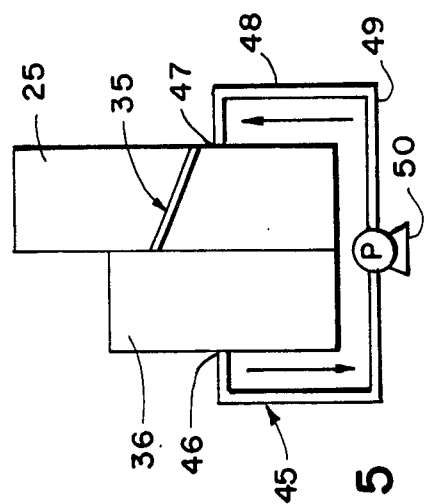
FIG. 5 is a schematic view of the pumping system utilized in the floatable material separation phase.
Figure 4:
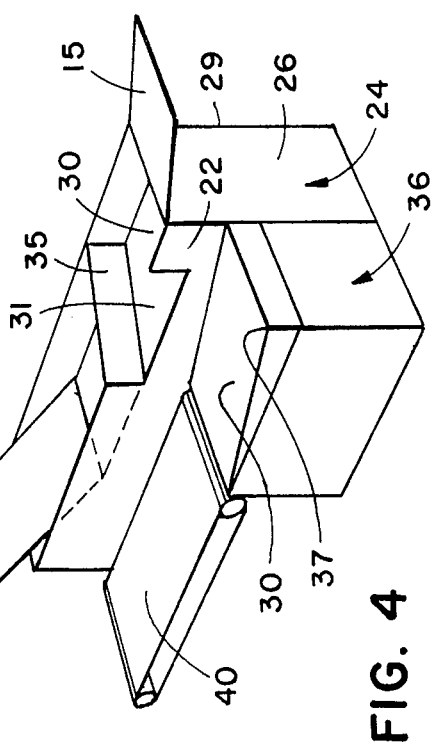
FIG. 4 is a perspective, fragmented view of the first embodiment of the present invention, illustrating the floatable material separation phase.

In an effort to recycle liquid 30 and provide a greater impetus to moving the floatable material toward notch 31, a fluid supply means 45 is provided between auxiliary tank 36 and floatation tank 25. As seen schematically in FIG. 5, fluid supply means 45 comprises an outlet port 46 in auxiliary tank 36 and an inlet port 47 provided in second side 29 of floatation tank 25. Conduit 49 connects ports 46, 47 to facilitate the desired water flow (illustrated by arrows 48). Fluidly connected with conduit 49 is a pump means 50 which generates the flow therethrough. The flow then, begins in floatation tank 25 and continues into auxiliary tank 36 via the waterfall through notch 31; it is thereafter drawn through outlet port 46 into conduit 49; and finally through inlet port 47 to return liquid 30 back to floatation tank 25. Thus, an extra current is provided in floatation tank 25 to more efficiently move the floatable material out of the tank, along with the resulting benefit of preserving and recycling liquid 30.

Disposed intermediate notch 31 and auxiliary tank 36 is an inclined grate 37 through which the waterfall passes and deposits thereon the floatable material. Grate 37 is also contiguous with first side 28 and extends entirely over the top of auxiliary tank 36. Although grate 37 may be constructed in numerous ways, in a preferred embodiment, it is fabricated of porcelain so that with the addition of liquid 30 on grate 37, the floatable material readily slides down the incline toward lower end 38 of grate 37.

Lower end 38 of grate 37 is adjacent a floatable material conveyor 40 which is positioned to receive thereon the floatable material and transport it away for collection or further working. A collection means, or one or a series of comminuting means (such as hammer mills 43, 44), may be placed at distal end 41 of floatable material conveyor 40. Since the floatable material consists primarily of wood, the first hammer mill 43 functions to form the wood into wood chips. Wood chips are a common form for wood to take when it is to be sold as an additional fuel source for an incinerator. Further, a second hammer mill 44 may be provided to receive the wood chips and create sawdust therefrom if so desired by the secondary user; for instance, it is contemplated that sawdust could be blown into a coal-burning incinerator. It may also be desirous to provide a magnetic means 54 after comminuting means 43, 44, to remove additional ferrous metals which were embedded in the wood, such as nails. Note that these additional working procedures and secondary uses are merely exemplary and could be changed or modified to suit any secondary use for the floatable material.

In floatation tank 25 the heavy material of the debris sinks in liquid 30, and is therefore, not carried over notch 31. Heavy material conveyor 51 is positioned within floatation tank 25 to effect therefrom removal of the heavy material debris. Conveyor 51 is provided with a first and second end 52, 53, and is inclined in tank 25 so that first end 52 is received beneath the liquid surface level and second end 53 is located above liquid 30. More specifically, first end 52 of conveyor 51 is positioned adjacent first end 26 of tank 25 near the bottom surface thereof. The width of conveyor 51 is dimensioned to extend across the entire width of tank 25 so that it may catch substantially all of the heavy material debris deposited therein. Conveyor 51 further extends from first end 52 toward second end 53 substantially along the longitudinal axis of floatation tank 25 and at an inclined angle generally in the range of 30 degrees or less; although a greater inclination may be used if the conveyor belt surface is made of a material with a high coefficient of friction. Note that conveyor 51 passes beneath diverter 35 a sufficient distance so as to obviate any interference therewith.

Figure 2:
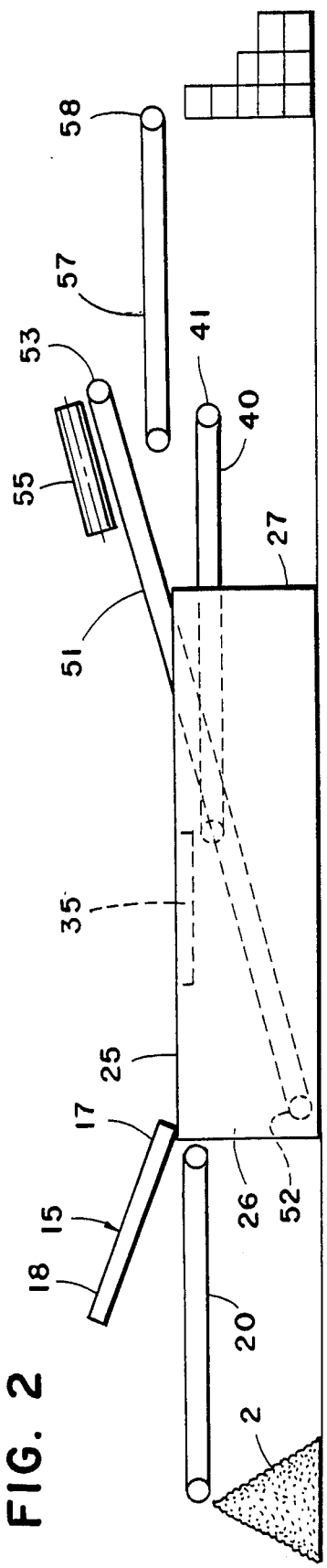
FIG. 2 is a side elevational view of the first embodiment of the present invention.
Figure 3:
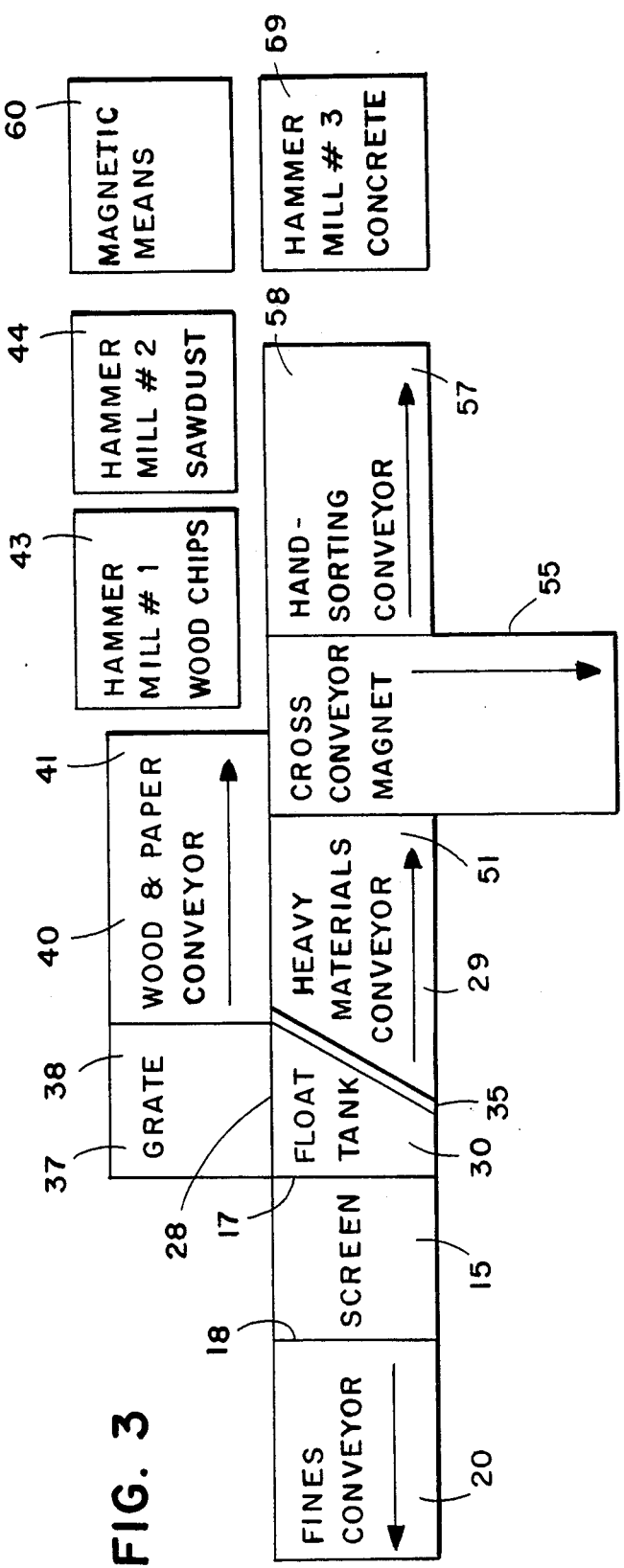
FIG. 3 is a schematic view of the first embodiment of the present invention.

Located above heavy material conveyor 51, near second end 53, is magnetic conveyor 55 which is designed to remove, from the heavy material debris, ferrous metals which may then be resold. Magnetic conveyor 55 is preferably of conventional design in which an electromagnet is positioned between the belts of conveyor 55 to attract and hold ferrous metals thereto. Magnetic conveyor 55 is positioned transversely over heavy material conveyor 51, so that the ferrous metals may be transported quickly to the side of heavy material conveyor 51 for disposal in a suitable collection means. This arrangement permits the use of a smaller electromagnet than might otherwise be required, since it must only retain the material to magnetic conveyor 55 a short distance. The efficiency achieved by magnetic conveyor 55 is further maximized by it being positioned in a plane parallel to heavy material conveyor 51, so that the entire width of magnetic conveyor 55 may be effectively utilized to remove the ferrous metals (FIG. 2). Lastly, note that magnetic conveyor 55 is adjustable in elevation t suit the desired need of the operator, which again enables system 10 to maximize ferrous metal removal.

The heavy, nonferrous debris continues on conveyor 51, past magnetic conveyor 55, and over second end 53, wherein it is deposited on hand-sorting conveyor 57. Hand-sorting conveyor 57 is generally horizontal and positioned at a height convenient for a manual sorting operation. The manual sorting clearly requires some utilization of extra manpower, but the debris at this point has been substantially reduced and drawn out making separation by hand an easy procedure.

Primarily, the material that is manually separated includes electrical wire, glass, aluminum and the like, of which most or all can be resold to recycling plants. Once all the material to be hand sorted has been removed, the material remaining on conveyor 57 comprises substantially pure concrete and brick debris 5. A third comminuting means, such as hammer mill 59, may be provided at distal end 58 of hand-sorting conveyor 57 to receive concrete and brick debris 5 to thereby mill it into gravel which is then, for example, suitable for use in parking lots. Again, this is merely exemplary of a secondary use, and any further means for working concrete and brick debris 5 could be provided.

Second Embodiment

In a second embodiment 75 of the invention, auxiliary tank 36 is completely eliminated. This design facilitates use by an operator who possesses only a limited amount of space with which to locate system 10. More specifically, second embodiment 75 of system 10 drastically reduces the width of system 10 while only lengthening it slightly. While this arrangement works well, it is somewhat less efficient in separating the floatable material from the debris. Note, that in the following discussion like parts will be identified with the same reference numerals as they were in first embodiment 24.

Second embodiment 75 comprises a floatation tank 60 that is generally quadrangular in shape and provided with a first end 61 positioned adjacent screen means 15 to receive therefrom demolition debris into liquid 30. Spaced from first end 61 and positioned at an incline to tank 60, is a floatable material conveyor positioned at an angle generally 30 degrees or less; although a greater inclination may be used if the conveyor belt surface is made of a material with a high coefficient of friction. Floatable material conveyor 65 is provided with a first and second end 66, 67, wherein first end 66 is received into liquid 30, but only extends a short distance therein so that it does not interfere with heavy material conveyor 51. Second end 67 projects up out of liquid 30 toward, but spaced from, second end 62 of floatation tank 60. In this arrangement, the floatable material is picked up off the surface of liquid 30 and transported up toward second end 67 of conveyor 65. Upon reaching second end 67, the floatable material is deposited onto a transporting means, such as slide arrangement 68, so as to be collected in a suitable container or alternatively directed to comminuting means as discussed earlier.

To drive the floatable material in the floatation tank toward the floatatable material conveyor 65, a current is established in floatation tank 60. The current is generated by conduit 70 which is fluidly coupled to first and second ends 61, 62 of floatation tank 60. Pump means 71 is fluidly connected to conduit 70, so as to pull liquid 30 into port 72 located on second end 62 of tank 60 and to disperse liquid 30 out port 73 located on first end 61 of tank 60. Hence, a current is created which flows from first end 61 of tank 60 toward floatable material conveyor 65, so that greater efficiency is achieved for removing the floatable material from liquid 30.

Positioned beneath floatable material conveyor 60 lies a heavy material conveyor 51 which functions in the same fashion as set forth in regard to first embodiment 24. The sole modifications existing in the fact that it is lengthened and mounted generally at a lesser inclination, so that there is no interference with floatable material conveyor 60. The remaining "downstream" components of the second embodiment are generally identical to those previously described in conjunction with the first embodiment.

Of course, it is understood that the above are merely preferred embodiments of the invention, and that various other embodiments as well as many changes and alterations may be made without departing from the spirit and broader aspects of the invention as defined in the claims.

The embodiments of the invention in which an exclusive property or privilege is claimed are defined as follows:

1. A system for sorting demolition debris into preselected groups, wherein said system comprises:
   screen means for sorting therethrough from said debris fine particulate material;
   a floatation tank, substantially filled with a liquid, positioned to receive said debris from said screen means, whereby said debris is sorted such that floatable material is separated from said heavy material, wherein said floatation tank is further provided with first and second sides and first and second ends, wherein said first end is positioned adjacent said screen, and wherein said first side is provided with a notch at an upper portion thereof near said first end of said tank, whereby said liquid containing said floatable material may be passed through said notch and out of said tank;
   means for removing said floatable material from said liquid which includes: an auxiliary tank positioned adjacent said floatation tank beneath said notch, whereby said liquid passing through said notch is collected therein; an inclined grate mounted adjacent to said floatation tank between said notch and said auxiliary tank, wherein said floatatable material is deposited thereupon and wherein said liquid is passed therethrough to said auxiliary tank; and a diverter provided with first and second ends which extends across said upper portion of said floatation tank at an angle such that said first end is attached to said first side of said floatation tank at a first position and said second end is attached to said second side of said floatation tank at a second position, wherein said first position is spaced further from said first end of said floatation tank than said second position, whereby said floatable material is directed toward said notch and out of said floatation tank;
   a heavy material conveyor provided with first and second ends, and which is positioned at an incline such that said first end of said conveyor is received within said liquid to receive the heavy material received in said tank from said screen means, and said second end of said conveyor extends upwardly above said liquid;

magnetic conveyor means positioned above said heavy material conveyor for removing ferrous metals from said heavy material debris; and a hand-sorting conveyor to receive from said heavy material conveyor nonferrous heavy material debris, whereby various construction materials may be manually removed from the debris on said hand-sorting conveyor.

2. The system of claim 4 further comprising a floatable material conveyor positioned adjacent said inclined grate so as to receive said floatable material therefrom, and transport said floatable material to at least one comminuting means.

3. The system of claim 1 in which said means for removing said floatable material from said liquid further comprises a fluid conduit connected to said auxiliary tank to receive liquid therefrom through a first port, and connected to said second side of said floatation tank to disperse liquid therein through a second port, and a pump means for generating a flow of said liquid through said conduit, whereby said liquid is recycled from said auxiliary tank to said floatation tank and whereby a current is established in said floatation tank to additionally direct said floatable material toward said notch.

4. A system for sorting demolition debris, wherein said system comprises:

means for removing from said debris fine particulate material;

a floatation tank substantially filled with liquid and adapted to receive said debris from said fine particulate removing means, and separate said debris into floatable material and heavy material, said floatation tank including a first and second side, in which said first side is provided with a notch in an upper edge thereof, whereby liquid and floatable material may exit said floatation tank;

a diverter provided across said floatation tank to direct said floatable material toward said notch;

an auxiliary tank positioned adjacent said floatation tank beneath said notch, whereby said liquid passing through said notch is collected therein;

an inclined grate mounted adjacent to said floatation tank between said notch and said auxiliary tank, wherein said floatable material is deposited thereon and wherein said liquid is passed therethrough to said auxiliary tank; and a heavy material conveyor provided with a first and second end, which is positioned at an incline such that said first end of said conveyor is received within said liquid to receive said heavy material received in said floatation tank, and said second end of said conveyor extends upwardly above said liquid, whereby said heavy material is removed from said floatation tank.

5. The system of claim 4 in which said means for removing said floatable material from said liquid further comprises a fluid conduit connected to said auxiliary tank to receive liquid therefrom through a first port, and connected to said second side of said floatation tank to disperse liquid therein through a second port, and a pump means for generating a flow of said liquid through said conduit, whereby said liquid is recycled from said auxiliary tank to said floatation tank and whereby a current is established in said floatation tank to additionally direct said floatable material toward said notch.

* * * * *